INVENTORS.
ELLIOT BRYANT FITCH
DAVID W. LEYSHON
BY: Arnold Grant
ATTORNEY.

United States Patent Office 3,511,602
Patented May 12, 1970

3,511,602
PROCESS FOR FILTERING PHOSPHATE ROCK ACIDULATION SLURRIES
Elliot Bryant Fitch, Hackleberry Lane, Weston, Conn. 06880, and David William Leyshon, 110 Cross Highway, Westport, Conn. 06880
Filed Apr. 19, 1967, Ser. No. 632,041
Int. Cl. C01f 1/46
U.S. Cl. 23—122                                3 Claims

ABSTRACT OF THE DISCLOSURE

The present invention relates to the filtration step in the hemihydrate wet process preparation of phosphoric acid. More particularly, the present invention relates to the use of a single shared-time filter as the filter medium for separating the phosphoric acid from both the hemihydrate filter cake and the gypsum filter cake.

---

Figure 1:
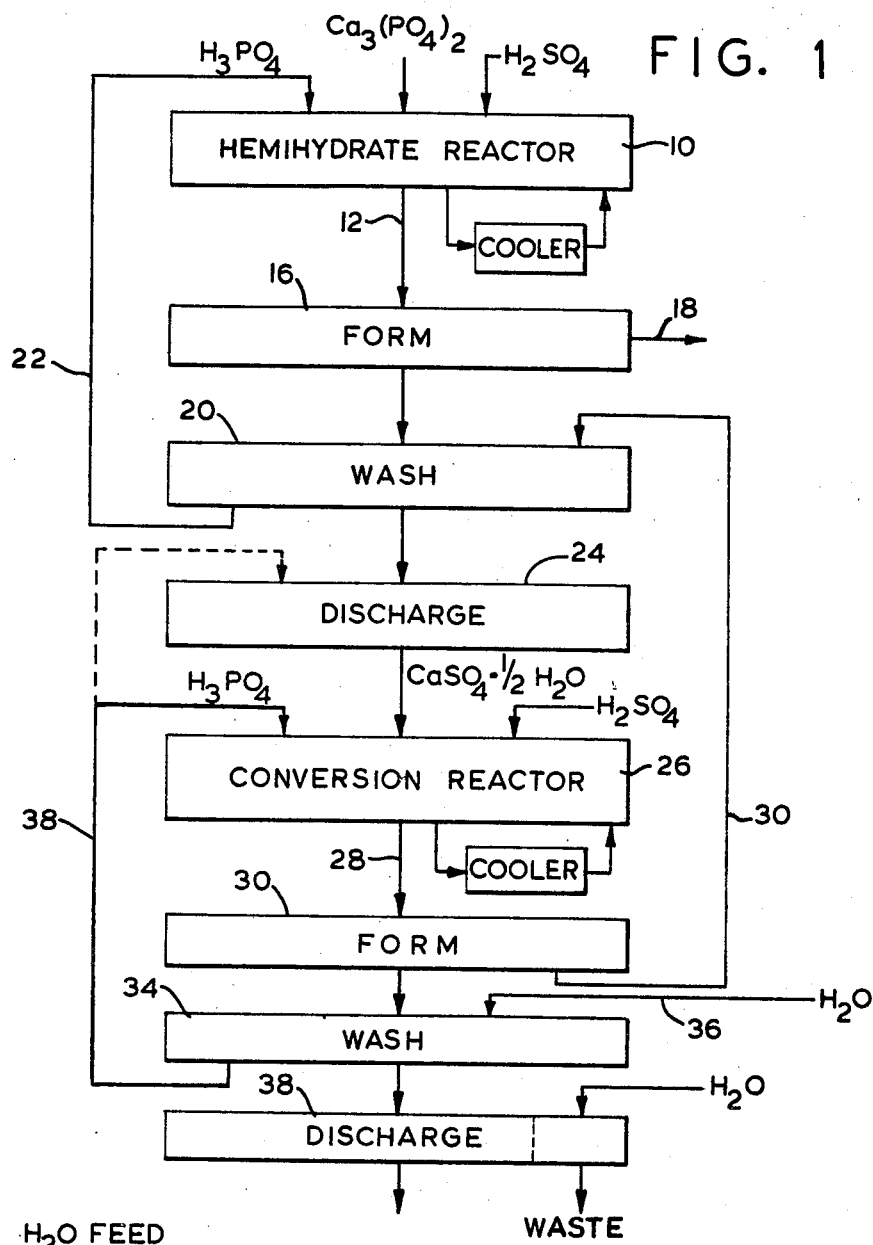

The wet hemihydrate process for the production of phosphoric acid as first disclosed in U.S. Pat. 1,836,672, and as subsequently refined by those in the art, is a well known industrial process. Basically, it comprises the steps of reacting the phosphate rock in a first treatment zone, with sulphuric acid and recycled weak phosphoric acid. The resulting calcium sulphate hemihydrate-phosphoric acid slurry is then transferred to a first filter to separate the precipitate from the liquor; the filtrate being in the order of 40% $P_2O_5$ content. After the initial separation the hemihydrate filter cake is subjected to a displacing wash of weak phosphoric acid from the gypsum circuit, with the corresponding wash filtrate supplying the weak phosphoric acid for the reaction in the first treatment zone.

The calcium sulphate hemihydrate, with entrained weak acid, is discharged from the first filter to a second treatment zone for the recrystalization and conversion into gypsum. Weak phosphoric acid which may be admixed with additional sulphuric acid is added to the treatment zone and the resulting gypsum-phosphoric acid slurry transferred to a second filter. The filtrate, usually around 20% $P_2O_5$ content, is used as the wash medium for the hemihydrate step. The gypsum filter cake is then subjected to a displacing wash, with water as the wash medium; the filtrate from this step providing the weak phosphoric acid for the second treatment zone.

Although the wet method produces a relatively high $P_2O_5$ concentration, investigation has shown that a disproportionately large amount of $P_2O_5$ values are normally lost. This loss has been traced to the hemihydrate filtrate step and to the inherent scaling properties of the hemihydrate filter cake. The hemihydrate, being chemically the same as plaster of Paris, tends to react and "set-up" when brought into contact with water or any solution which is not hot and highly concentrated. Properly prepared hemihydrate may be washed with water or a weak acid on a filter without this adverse effect, because of the slow reaction rates. However, whatever hemihydrate particles remain entrapped in the filter medium will gradually rehydrate, sealing the medium and cutting off flow; thus, unless the filter medium is washed vigorously, and at frequent intervals it will lose capacity and effectiveness. If a "tipping pan" or belt type filter is used it is desirable to water wash the filter medium after every operating cycle. However, after each cake discharge step, the filter medium and deck retain some of the $P_2O_5$ acid used as the displacement wash agent. As the wash water is added to cleanse the filter medium for the next operating cycle the $P_2O_5$ values in this acid are correspondingly diluted and discharged with the wash water to waste.

Those attempts which have been made to recover these residual $P_2O_5$ values have not met with commercial success because the amount of water which would be added to the system by incorporating this very dilute acid into the process would place too great a load on the evaporators to permit economic recovery of the $P_2O_5$.

Applicants have overcome this significant loss of $P_2O_5$ values by utilizing a single shared-time, double operating cycle filter as the separating medium for the entire wet process. The hemidydrate and the gypsum are both filtered through the same medium with the hemihydrate filtered in one operating cycle and the gypsum filtered in the other operating cycle. In this manner, the filter medium, after the hemihydrate filter cake is discharged, instead of being washed with water which would only waste any wash acid remaining in the filter medium, is recharged with gypsum for the gypsum-weak acid separation cycle. At the end of the complete filtration operation essentially all $P_2O_5$ values have been displaced from both the filter cake and the filter medium. When the gypsum filter cake has been discharged the filter medium can be washed with as much water as is necessary to clean it thoroughly. By this operation losses of $P_2O_5$ are reduced to an insignificant level.

It is therefore an object of the present invention to maximize $P_2O_5$ recovery from the wet process of producing phosphoric acid.

It is another object of the present invention to utilize a shared-time filter as the filter medium in producing phosphoric acid.

It is still another object of the present invention to filter the hemihydrate and the gypsum products of the wet process of producing phosphoric acid in the same filter medium.

Figure 2:
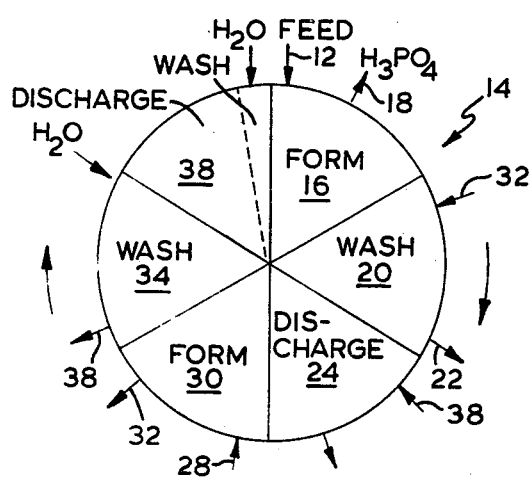

The subject matter which applicants regard as their invention is particularly pointed out and distinctly claimed in the concluding portion of this specification. The invention, however, as to its organization and method of operation together with further objects and advantages thereof will best be understood by reference to the following description taken in conjunction with the accompanying drawings in which:

FIG. 1 is a flow sheet of a process in which the principles of the invention are embodied; and FIG. 2 is a diagrammatic representation of a shared-time filter as used in the present invention and depicting the various relationships of feeds and discharges.

Referring now to the drawings, the wet process for invention is particularly pointed out and distinctly producing phosphoric acid incorporating the present invention will be described in detail. Phosphate rock, sulphuric acid and weak recycled phosphoric acid are each introduced into the first stage of the process, the hemihydrate reactor 10, which diagrammatically represents the agitator tanks, coolers and any other necessary elements. The resulted product, which is a slurry of calcium sulphate hemihydrate crystals suspended in phosphoric acid, is then transferred through conduit 12 to a shared-time, double operating cycle filter 14. The filter is illustratively shown in FIG. 1 as six separate stations, each station depicting the operating stages which an individual filter zone assumes during the filtering operation.

From conduit 12 the reactor slurry is poured into a filter zone for forming in the first stage 16 of the filtering operation. The strong acid filtrate seeps through the filter medium and goes to a collection tank (not shown) through conduit 18. The filter zone is then shifted to a washing station 20 where the filter cake is subjected to a counter-current displacement washing with weak acid, recycled in a manner presently to be described, as the washing agent. The filtrate from this stage is discharged through conduit 22 and is used as the recycled wash acid in the hemihydrate reactor. The filter zone is shifted again and the hemihydrate filter cake is discharged at station 24 into the gypsum conversion reactor 26. Weak acid from the gypsum filtration cycle may be introduced into the filter zone at this point to aid the filter cake discharge and remove all the hemihydrate from the filter medium.

The hemihydrate is dissolved in the conversion reactor and re-precipitated to gypsum; the resultant gypsum-weak acid slurry is transferred from the reactor back to the shared-time filter 14 through conduit 28. At this point the slurry is fed into the freshly emptied and acid washed filter zone, which is now positioned in forming station 30 for the second half of the filter operating cycle. Filtrate from this station is discharged through conduit 32 and provides the wash medium for the hemihydrate washing station 20. The filter zone shifts position again and the formed gypsum cake is subjected to a displacement wash, at station 34 with fresh water from conduit 36 as the washing medium. It will be noted that this is the first time that water has been introduced into the system. Filtrate from this washing operation is transferred through conduit 38 to provide the recycled weak acid for the conversion reactor and to provide wash acid for the hemihydrate discharge station 24. The washed gypsum filter cake is then discharged at station 38 for any further desired treatment. The shared-time filter zone having now come full cycle through two complete filtrations, can be thoroughly washed with water to free any undischarged gypsum before being recharged with the hemihydrate slurry for another cycle. By the time the gypsum filter cake is discharged the filter medium and deck retain only wash water, or at most only highly diluted weak acid. Thus $P_2O_5$ loss during the filter medium washing is reduced to an absolute minimum.

As this invention may be embodied in several forms without departing from the spirit or essential character thereof, the present embodiment is illustrative and not restrictive. The scope of the invention is defined by the appended claims rather than by the description preceding them, and all embodiments which fall within the meaning and range of equivalency of the claims are therefore intended to be embraced by those claims.

We claim:

1. A process for filtering slurries resulting from the acidulation of phosphate rock, said acidulation being conducted so as to initially form a slurry of calcium sulphate hemi-hydrate in phosphoric acid which is filtered and the resulting hemi-hydrate filter cake is recrystallized to form a slurry of gypsum in phosphoric acid which comprises establishing an endless continuously moving filter area having a first filtration zone for filtering said calcium sulphate hemi-hydrate slurry, and a second filtration zone for filtering said gypsum slurry, said filtration zones being spaced from each other in the direction of movement of said filter area by a first wash zone and a first cake discharge zone for the hemi-hydrate following said first filtration zone and a second wash zone and a second discharge zone for the gypsum following said second filtration zone, feeding said calcium sulphate hemi-hydrate to said first filtration zone for filtration thereon, washing in said hemi-hydrate wash zone the resulting hemi-hydrate filter cake with filtrate liquor recovered from said second filtration zone, recycling the spent wash liquor containing recovered $P_2O_5$ from said hemi-hydrate washing zone to said acidulation step, discharging the washed hemi-hydrate cake from said hemi-hydrate discharge zone, subjecting the thus discharged hemi-hydrate cake to recrystallization to form a slurry of gypsum in phosphoric acid, feeding said gypsum slurry to said second filtration zone for filtration thereon to produce gypsum filter cake, washing in said gypsum wash zone said gypsum filter cake with water, recycling at least a portion of the resulting spent wash liquor to said recrystallization step, discharging the washed gypsum cake from said gypsum discharge zone, and applying a cleansing wash to the filter area solely in a zone between said gypsum cake discharge zone and said hemihydrate filtration zone.

2. The process of claim 1 wherein the acid for the acidulation of phosphate rock is sulphuric acid and the filtrate resulting from the washing of said hemi-hydrate cake.

3. The process of claim 1 wherein a portion of the wash filtrate, resulting from the washing of the gypsum filter cake, is used to wash the filter medium after discharge of the hemi-hydrate cake.

References Cited

UNITED STATES PATENTS

| Re. 19,045 | 1/1934 | Larsson | 23—165 |
| 2,799,557 | 7/1957 | Seyfried et al. | 23—165 |
| 2,885,264 | 5/1959 | Peet | 23—165 |

HERBERT T. CARTER, Primary Examiner

U.S. Cl. X.R.

23—165